United States Patent [19]

Heiskell

[11] Patent Number: 5,050,372
[45] Date of Patent: Sep. 24, 1991

[54] FENCE ROW CLEANER

[76] Inventor: Merle L. Heiskell, 602 Cherry, Dalhart, Tex. 79022

[21] Appl. No.: 551,491

[22] Filed: Jul. 11, 1990

[51] Int. Cl.$^5$ .......................................... A01D 34/64
[52] U.S. Cl. ...................... 56/12.7; 56/15.2; 56/15.6; 56/255; 56/295; 56/DIG. 9
[58] Field of Search ...................... 56/14.9, 12.7, 15.1, 56/15.2, 15.9, 255, 295, DIG. 9, DIG. 10, DIG. 14

[56] References Cited

U.S. PATENT DOCUMENTS

| 3,058,285 | 10/1962 | Jolls | 56/10.4 |
| 3,274,762 | 9/1966 | Jolls | 56/15.2 |
| 4,250,621 | 2/1981 | Houle | 56/295 |
| 4,956,965 | 9/1990 | Parsons, Jr. | 56/15.2 |

OTHER PUBLICATIONS

Beaver, P10 Flail Cutter Brochure, Polymark Beaver Equipment, Ltd., Jan. 1987.

Primary Examiner—Terry L. Melius
Attorney, Agent, or Firm—Wendell Coffee

[57] ABSTRACT

This invention is a mowing machine which is to be hitched to the back of an agricultural tractor. The primary purpose of the invention is to cut and clean vegetation and debris from along agricultural fence rows. The cutting assembly of the mowing machine includes flails which are rapidly rotated and are made from fabric reinforced rubber. The flails are flexible and are about two feet long, about three-fourths of an inch thick, about three inches wide, and weigh about five pounds. The invention may be used to cut and remove vegetation and debris from under fence rows since the flails are flexible and easily mow around fence posts without damaging either the posts or the flails. The cutting assembly can be positioned so that a plane in which the cutting flails rotate is either inclined or declined to match the inclined slopes of embankments and declined slopes of drainage ditches.

16 Claims, 3 Drawing Sheets

FENCE ROW CLEANER

BACKGROUND OF THE INVENTION

1. Field of the Invention

This invention relates to mowing machines; and more specifically, to large agricultural mowing machines used to mow along roadsides, along drainage ditches, and under agricultural fence rows beneath the fencing and between the fence posts. Those with ordinary skill in the art are designers and makers of large agricultural mowing equipment.

(2) Description of the Related Art

Various heavy mowing machines are used to cut and clear heavy vegetation and debris from along roadways, ditches, and fence rows. These machines are more substantial than lawn mowers used by homeowners in that they have the ability to cut underbrush, small trees, and heavy vegetation that is intermingled with other debris. Most of these mowing machines are designed to be attached to agricultural tractors. One such apparatus is shown in U.S. Pat. No. 2,052,802, to Schatz entitled "Weed and Vine Cutter." In that invention, a rotating disc is inclined so that as the tractor to which the weed cutter is attached moves along the ground, the leading edge of the cutting disc is positioned just below the ground's surface and severs and uproots any weed or vine it encounters. U.S. Pat. No. 4,802,327 to Roberts shows a mower attachment which includes a guarded cutting head assembly that has a cutting chain rotating about the perimeter of the assembly. Unlike most other mowing machines, this invention makes it possible to mow beneath fence lines as well as around fence posts. To mow beneath the fence line, the tractor to which the cutting head is connected is guided along the fence row and the cutting head is positioned below the fencing. As a fence post is approached, the cutting head is manually repositioned by the operator so that the cutting head passes around the fence post and is then repositioned back under the fencing on the far side of the post. While Roberts' invention does make it possible to clear debris and vegetation from below a fence line, it has the drawback of having to be manually repositioned around each and every fence post. The inability to mow along the fence line without repositioning the cutting mechanism at every fence post is a common drawback to most mowing machines.

A problem inherent to agricultural bladed rotary mowing machines is their inability to be maneuvered under the fencing and between the fence posts because of their unwieldy and bulky nature. Additionally, many mowing attachments do not have provisions for positioning the cutting mechanism into any position other than directly behind the tractor.

One cutting machine that operates similarly to the invention disclosed below is the familiar Weed Eater used in domestic lawn care which has a rapidly rotating monofilament line that severs vegetation as the line is whipped through it.

SUMMARY OF THE INVENTION

(1) Progressive Contribution to the Art

This invention includes a cutting apparatus that attaches to the back of an agricultural tractor and cuts and removes heavy vegetation, and other debris that has either grown or accumulated along roadways, ditches, and fence rows. The invention's ability to remove thistles, more commonly known as tumble weeds, is particularly desirable in areas such as West Texas where these thistles accumulate at the base of fence rows.

The cutting and removal is accomplished by a cutting assembly that includes rapidly rotating cutting flails that sever the thistles and vegetation and then propel most of the resulting debris from the cutting path. The cutting flails are constructed from flexible fabric reinforced rubber. When the flails are not being rotated they hang freely, but when they are rotated rapidly, the flails become more rigid due to the centrifugal force generated by the rotation.

The cutting assembly is connected to the tractor by a three point hitch to which the cleaner's frame is fixed. The cutting assembly is located at the far end of a boom that is pivotally connected to an extension beam that is permanently fixed to the hitch. The cutting flails are connected to a flail shaft that is rotated by a hydraulic motor capable of producing various rates of rotation depending upon the task to be performed. Because the boom is pivotally connected, the cutting assembly can be positioned to the side of the tractor so that areas other than those directly behind the tractor can be cut and cleared. The ability to cut and clear along fence rows is facilitated by this to-the-side positioning feature.

Due to the characteristics of the flails and the rate at which they are rotated, the flails will not cut through fence posts while at the same time cutting and clearing the vegetation about the post. As a result, the tractor can travel parallel to the fence row without moving the cutting unit around each and every fence post. This is possible because only the flails themselves extend below the fencing; the rest of the cutting assembly remains to one side of the fence row and moves parallel to that row. As the cutting assembly approaches and passes a fence post, the flexible flails bend around the post allowing the assembly to pass the post without damaging the post or the flails. Once the cutting unit has passed the fence post, the flails once again extend due to the centrifugal force created by the rapid rotation and continue clearing beneath the fence row.

This invention makes it possible to clear the area immediately adjacent to a fence post cleanly because the cutting flails may contact the post without damaging it and the closeness of the cut is not dependent on an operator's ability to maneuver the cutting assembly near the post without actually contacting it.

The flails are connected to a circular disc and are configured so that the weight of the flails is evenly distributed about the disk. This requires that there be at least two like flails equally spaced about the circumference of the disk. In this way the rotation of the cutting unit is balanced and there is less vibration associated with its operation. If the flails on one disk are of different weights, the positioning of the flails may be adjusted to compensate and balance the flails.

The boom has a tilting assembly located along its length that allows the cutting assembly to be raised and lowered in an arc about that tilting assembly. Raising and lowering the cutting assembly makes it possible for the invention to mow inclines and declines along which the tractor may travel.

It is envisioned that the best mode of the invention would additionally include a rotation joint in the extension beam that allows a portion of the invention behind the joint and away from the tractor to be rotated about a center line of that beam. More specifically, the rotation joint allows the cutting assembly to be rotated about the center line of the extension beam. This further enhances the ability of the invention to position the rotating cutting flails at different inclines and declines to horizontal. This is of particular benefit when ditches and embankments require mowing and clearing.

The rotating, raising, and lowering features all contribute to the invention's ability to mow along different and varying ground features. It also contributes to the invention's ability to handily remove heavy vegetation and debris from around such fixed objects as fence posts and trees.

Above the boom is a deflection plate which is wider and longer than the boom and whose purpose is to prevent a large amount of the debris and vegetation from being whipped up by the flails and thrown in a direction that could strike the operator. The deflection plate is a safety feature.

The pivoting action of the boom is limited by two blocks, one attached to each side of the extension beam. It is in this way that the cutting unit is prevented from pivoting forward uncontrollably past a position where the boom is at a right angle to the extension beam. Additionally, there is a restraining assembly that connects the boom to the hitch assembly and prevents the boom from pivoting backward away from the tractor beyond the limitation of a restraining cable's length. The blocks and the restraining cable operate in conjunction to hold the cutting unit to the side of the tractor thereby making it possible to clear an area outside the tractor's path.

This invention's primary benefit is its above described ability to mow along a fence row without having to deviate the line of travel of the tractor to go around each and every fence post. The cutting flails cut and remove vegetation and debris underneath a fence row, as well as cut up to and around the fence posts without damage to either the post or the flails. This invention can be similarly used to mow around mature trees without damaging the tree's trunk. Another benefit of this invention is that inclines and declines along which it is possible for a tractor to travel can be easily mowed because of the many positions made possible by the cleaner's three positioning mechanisms: the tilting mechanism in the boom, the pivoting mechanism by which the boom is pivotally connected to the extension beam, and the rotation mechanism in the extension beam.

Another benefit of the invention is its ability to create a depression in the ground by lowering the flails to the ground's surface and then allowing the flails to whip out a depression having a radius about equal to the length of the longest flail. One application of this ability to create a depression is to place the cutting unit so that it is centered over a hole that has been dug to plant some type of vegetation. This invention is then used to dig a depression about the hole so that after the vegetation is planted, water may be reservoired in the depression helping to assure a successful transplant.

(2) Objects of this Invention

An object of this invention is to make it possible to cut vegetation.

Another object is to remove debris along fence rows.

Another object of this invention is to cut vegetation and remove debris along fence rows without having to maneuver the mowing apparatus to go around each and every fence post.

Another object of this invention is to make it possible to cleanly cut all vegetation from around a fence post without damaging that fence post.

A further object of this invention is to provide a mowing machine whose cutting mechanism can be easily positioned at an angle to horizontal making it possible to mow inclines and declines such as embankments and the sloping sides of ditches.

Still another object of the invention is to dig a circular depression into the ground; more specifically to create a depression about the top of a hole that has been dug for the planting of shrubbery or trees. This depression is then used to reservoir water after the planting of the shrub or tree in the deeper hole.

Further objects are to achieve the above with devices that are sturdy, durable, simple, safe, efficient, versatile, ecologically compatible, energy conserving, and reliable, yet inexpensive and easy to manufacture, attach, operate, and maintain.

Other objects are to achieve the above with a method that is rapid, versatile, ecologically compatible, energy conserving, efficient, and inexpensive, and does not require highly skilled people to attach, operate, and maintain.

The specific nature of the invention, as well as other objects, uses, and advantages thereof, will clearly appear from the following description and from the accompanying drawings, the different views of which are not necessarily scale drawings.

As an aid to correlating the terms of the claims to the exemplary drawing(s), the following catalog of elements is provided:

10 FENCE ROW CLEANER
12 AGRICULTURAL TRACTOR
14 HITCH ASSEMBLY
16 CLEANER FRAME
18 CUTTING ASSEMBLY
20 FLAIL SHAFT
22 UPPER SHAFT END
24 DISTAL SHAFT END
26 CUTTING FLAILS
28 POWER UNIT
30 CROSS BEAM
32 RIGHT CROSS BEAM END
34 LEFT CROSS BEAM END
36 CONNECTION PLATES
38 EXTENSION BEAM
40 BOOM
42 RIGHT FACE
44 LEFT FACE
46 RIGHT BLOCK
48 LEFT BLOCK
50 EXTENSION BEAM END
52 POWER UNIT END
54 HITCH ASSEMBLY END
56 BACK END
58 DEFLECTION PLATE

60 PIVOTING ASSEMBLY
62 RESTRAINING ASSEMBLY
64 TILTING ASSEMBLY
68 RESTRAINING CABLE
70 BOOM END
72 FASTENER END
74 FASTENER ASSEMBLY
76 LEG
78 SPRING LOADED TONGUE
80 SET OF TWO SQUARE PLATES
82 U-SHAPED FASTENER
84 TONGUE HOLE
86 PINTLE
88 EXTENSION BEAM TOP FACE
90 BOOM TOP FACE
92 BOOM BOTTOM FACE
94 CYLINDER
96 TOP COLLAR
98 DISK
100 BEARINGS
102 PIVOTING CONNECTION
104 CYLINDER SIDE STAY
106 POWER UNIT SIDE STAY
108 TILTING UNIT
118 BOOM PIN HOLE
120 EXTENSION BEAM PIN HOLE
122 COLLAR
124 LOCKING PIN
126 HYDRAULIC FLUID RESERVOIR
128 HYDRAULIC PUMP
130 VARIABLE HYDRAULIC VALVE
134 HYDRAULIC SUPPLY LINE
136 HYDRAULIC RETURN LINE
138 CONSTANT PRESSURE INLET VALVE

DESCRIPTION OF THE PREFERRED EMBODIMENTS(S)

Figure 1:
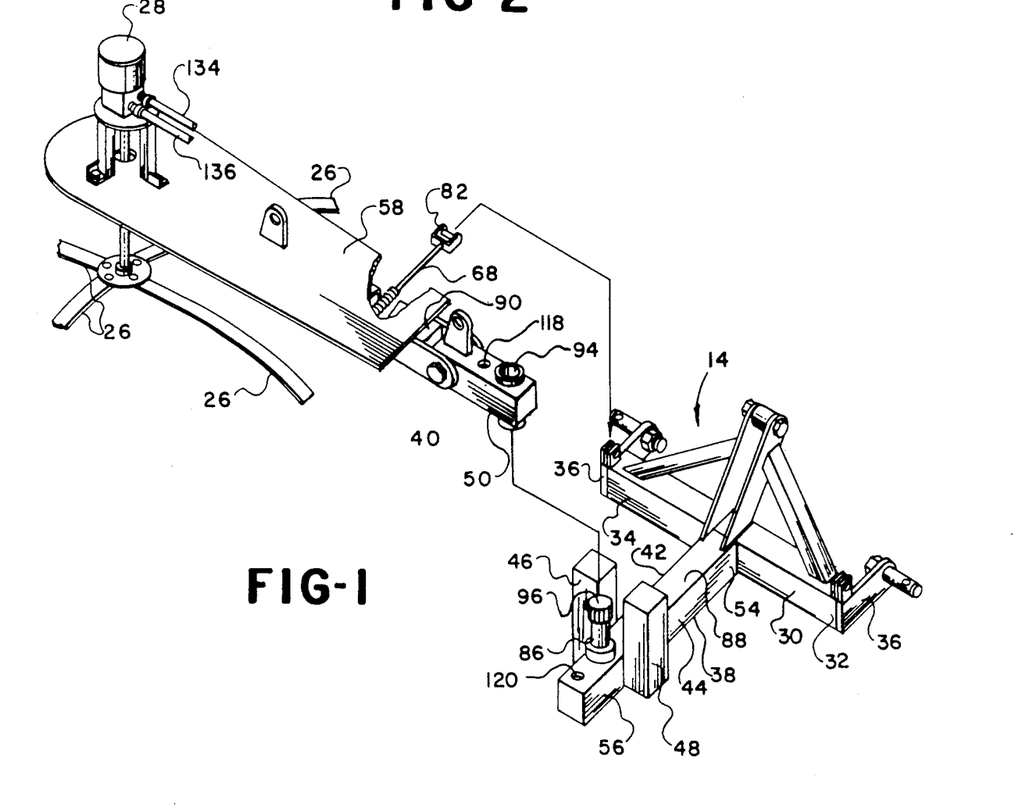
FIG. 1 is an exploded perspective view of the fence roW cleaner.
Figure 2:
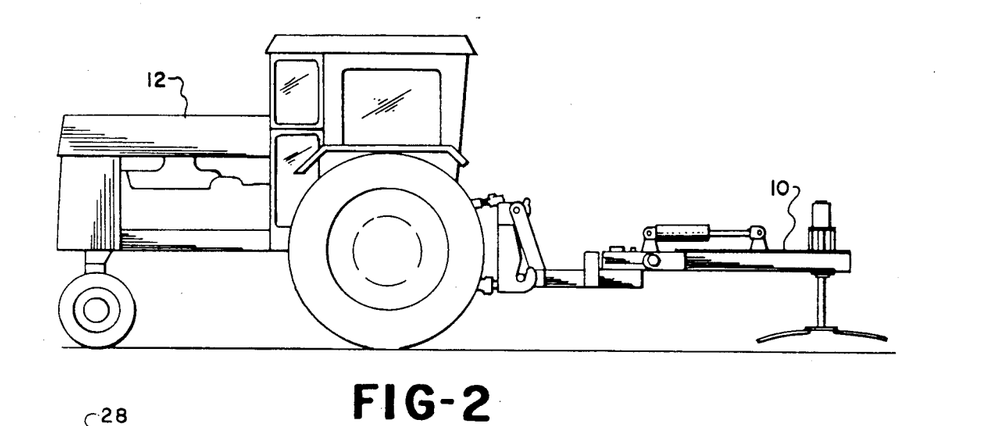
FIG. 2 is an assembly drawing of the fence row cleaner hitched to the agricultural tractor.

In the attached drawings, a fence row cleaner 10 may be seen. The fence row cleaner 10 is hitched to an agricultural tractor 12 by way of a hitch assembly 14. The hitch assembly 14 attaches to the tractor 12 in three places. A cross beam 30 forms the base of the hitch assembly 14 and has two connection plates 36 one each fixed to a right cross beam end 32 and a left cross beam end 34. The connection plates 36 are welded to the ends of the cross beam 30.

The fence row cleaner 10 includes a cleaner frame 16 to which components of the cleaner 10 are attached. The cleaner frame 16 includes an extension beam 38 and a boom 40. The extension beam 38 is constructed out of square tubular piping and has a hitch assembly end 54 and a back end 56. The extension beam 38 is the portion of the cleaner frame 16 that is fixed to the hitch assembly 14. The extension beam 38 is welded to the cross beam 30 at the hitch assembly end 54.

A center line of the cross beam 30 is perpendicular to a center line of the tractor 12 when the hitch assembly 14 is fastened to the tractor 12. The cross beam 30 is constructed out of square tubular piping and is oriented so that the four lateral sides are either horizontal or vertical. The extension beam 38 is welded about the cross beam's 30 midpoint at a vertical face away from the tractor 12.

When welded in this position, a center line of the extension beam 38 is perpendicular to a center line of the cross beam 30. Like the cross beam 30, the lateral sides of the extension beam 38 are either horizontal or vertical. One of the two vertical sides of the extension beam 38 is a right face 42 and is to the right of a center line of the extension beam 38 in a view of the cleaner 10 from the tractor 12 and a left face 44 that is to the left of a center line of the extension beam 38 in a similar view. The upper horizontal lateral side of the extension beam 38 is referred to as an extension beam top face 88.

When the cleaner 10 is assembled and the extension beam 38 is welded to the cross beam 30, the extension beam top face 88 and an upper horizontal face of the cross beam are level with each other and are located in the same horizontal plane.

Figure 4:
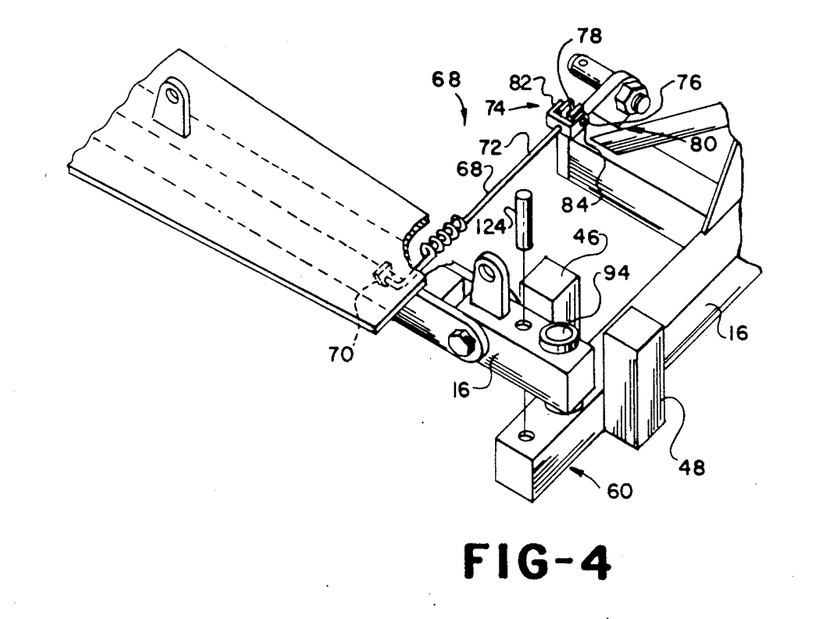
FIG. 4 is a cut away perspective view of an assembled fence row cleaner showing the restraining assembly, the fastener and the pivoting assembly.

A pintle 86 is fixed to the extension beam 38 at the back end 56. The pintle 86 is cylindrical in shape and is fixed to the extension beam 38 so that a center line of the pintle 86 is perpendicular to and intersects a center line of the extension beam 38. The pintle 86 is fixed to the extension beam top face 88 and projects upwardly. Top collar 96 is fixed to a top end of the pintle 86; and like the pintle 86, the top collar 96 is cylindrical in shape but has an outer diameter greater than an outer diameter of the pintle 86. The pintle 86 and the top collar 96 have a common center line.

Similar to the cross beam 30 and the extension beam 38, the boom 40 is also constructed from square tubular piping and has two ends; an extension beam end 50 that is pivotally connected to the extension beam 38 and a power unit end 52 which is opposite the extension beam end 50. The boom 40 has a boom top face 90 which is the upper horizontal side of the boom 40 and a boom bottom face 92 which is a lower horizontal side.

A cylinder 94 is located in the extension beam end 50 and said cylinder 94 is oriented so that a center line of the cylinder 94 is perpendicular to and intersects a center line of the boom 40. The cylinder 94 forms an open ended tube that extends through the boom top face 90 and the boom bottom face 92. The cylinder 94 has an inside diameter greater than an outer diameter of either the top collar 96 or the pintle 86. Because the cylinder's 94 diameter is greater, the cylinder 94 may be placed over the pintle 86 and the top collar 96 thereby pivotally connecting the boom 40, and all components attached to the boom 40 to the extension beam 38.

Extension beam pin hole 120 is drilled through extension beam top face 88 at a location between the pintle 86 and the extreme back end 56 of the extension beam 38. Boom pin hole 118 is drilled through the boom top face 90 and the boom bottom face 92 in a location that allows the boom pin hole 118 and the extension beam pin hole 120 to have a common center line when the boom 40 is positioned so that a center line of the boom 40 and a center line of the extension beam 38 are parallel and in a common vertical plane. When in this position with the boom 40 straight behind the extension beam 38, a locking pin 124 may be inserted down through the boom pin hole 118 and into extension beam pin hole 120 so that the pin 124 prevents rotation of the boom 40 about the pintle 86.

Deflection plate 58 is welded to the boom top face 90 so that the deflection plate 58 is located above the boom 40. The deflection plate 58 has a surface area greater than that of the boom top face 90 and extends beyond the vertical sides of the boom 40. Additionally, the deflection plate 58 extends beyond the power unit end 52 of the boom 40. The deflection plate 58 has a line of symmetry that is parallel to and directly above a center line of the boom 40.

Figure 3:
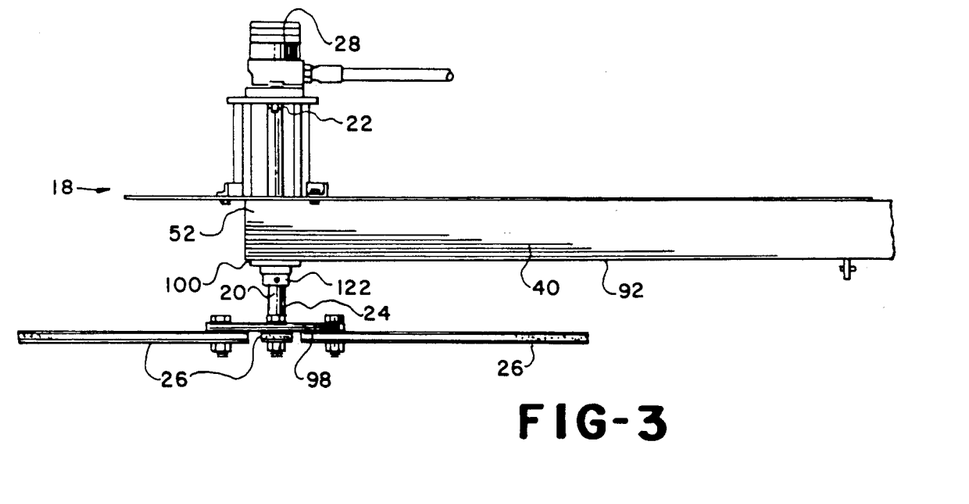
FIG. 3 is an elevation view of the cutting assembly.

Cutting assembly 18 is located at the power unit end 52 of the boom 40. The cutting assembly 18 includes a power unit 28, a flail shaft 20, four cutting flails 26, and a disk 98. The power unit 28 is a hydraulic motor that is powered by a hydraulic pressure source located on the tractor 12. The power unit 28 is bolted to the deflection plate 58 in this embodiment. The flail shaft 20 is rotatingly connected to the boom 40 and is oriented so that a center line of the flail shaft 20 is perpendicular to and intersects a center line of the boom 40. The flail shaft 20 has an upper shaft end 22 that is connected to the power unit 28 and a distal shaft end 24 that extends below the boom 40. The disk 98 is fixed to the distal shaft end 24.

The cutting flails 26 are bolted to the disk 98 at one end of each flail 26. The flails 26 are constructed from fabric reinforced rubber that has been cut into strips having these approximate dimensions: a width of about three inches, a thickness of about three-quarters of an inch, and a length of about two feet. Each flail weighs approximately five pounds. The cutting flails 26 are flexible; and when the flail shaft 20 is not rotating, the cutting flails 26 hang limply from the disk 98.

Figure 6:
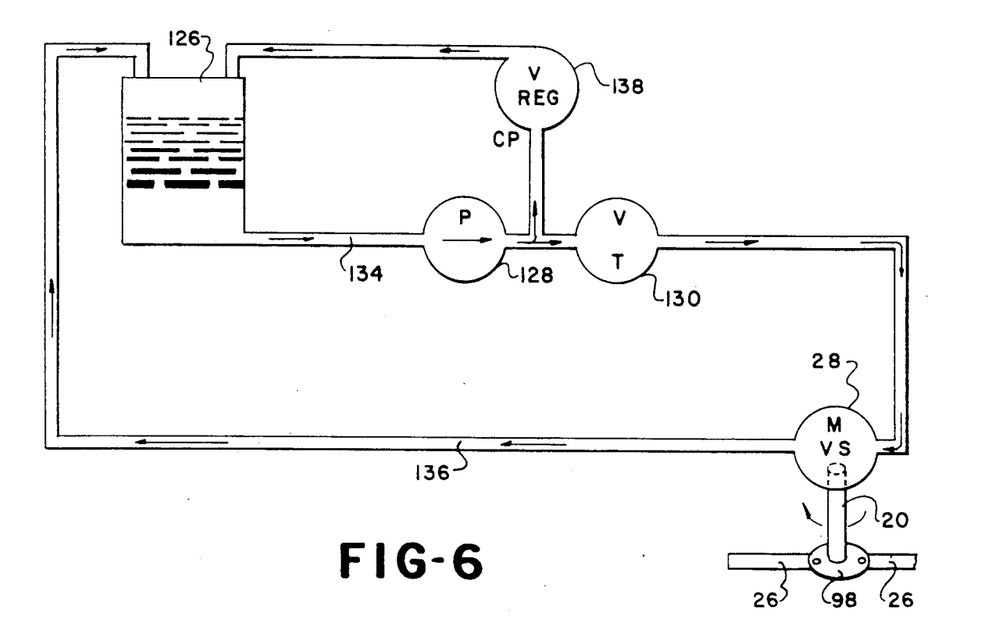
FIG. 6 is a schematic of the powering system for the power unit that rotates the flail shaft.

The power unit 28 has the capacity to rotate the flail shaft 20 at selected speeds up to 600 revolutions per minute. The speed at which the power unit rotates is determined by an operator on the tractor who positions a control lever so that the desired speed is selected. The desired speed is transmitted to a variable hydraulic valve 130 that regulates the flow of hydraulic fluid being pumped by hydraulic pump 128 from hydraulic fluid reservoir 126 through hydraulic supply line 134 to the power unit 28. Constant pressure at the inlet of valve 130 is assured by constant pressure inlet valve 138. Hydraulic fluid is returned to the reservoir 126 through hydraulic return line 136. The rate of rotation produced by the power unit 28 is determined by the flow rate of the supplied hydraulic fluid. The valve 130 is opened to increase the rate of flow thereby increasing the speed of rotation produced by the power unit 28. The power unit 28 rotates the flail shaft 20 to which the cutting flails 26 are attached. It is in this way that the cutting flails are rotated at the different speeds selected by the operator, depending on what task is to be performed.

When the fence row cleaner 10 is in operation and the shaft 20 is being rapidly rotated, the cutting flails 26 become more rigid due to the centrifugal force created by the rapid rotation. When the cutting flails 26 are in this rigid state during operation, the cutting flails 26 are extended at their full length away from the disk 98.

The rapid rotation of the flail shaft 20 within the boom 40 is facilitated by bearings 100 that are located at the boom bottom face 92. Vibration of the rotating elements of the cutting assembly 18 is minimized by the bearings 100 that fix the shaft horizontally.

The flail shaft 20 is vertically fixed by collar 122 which is located on the flail shaft 20 below the bearings 100 and prevents an upward movement of the shaft 20 within the bearings 100. The collar 122 is cylindrically shaped, approximately one inch long and has a center line common to that of the flail shaft 20. An outer diameter of the collar 122 is greater than that of the flail shaft 20. The thickness of the collar 122 prevents the collar 122 from entering the bearings 100.

The rotation of the boom 40 about the pintle 86 is limited by right block 46 and left block 48. The right block 46 is fixed to the right face 42 and the left block 48 is fixed to the left face 44. The blocks are positioned so that a back face of one of the blocks is parallel to and abutting a vertical side of the boom 40 that is toward the tractor 12 when the boom 40 is pivoted to the side of the extension beam 38 thereby orienting a center line of the boom 40 so that center line is perpendicular to a center line of the extension beam 38. The right block 46 and the left block 48 limit the pivoting action of the boom 40 thereby preventing the boom 40 from pivoting further forward than a position in which the boom 40 is at a right angle to the extension beam 38.

While the right block 46 and the left block 48 each limit forward pivoting action of the boom 40 toward the tractor 12, restraining assembly 62 limits backward rotation of the boom 40 away from the tractor 12. The restraining assembly 62 includes a spring tension restraining cable 68 that has a boom end 70 and a fastener end 72. The boom end 70 is attached to the boom bottom face 92. A U-shaped fastener 82 is fixed to the fastener end 72 of the restraining cable 68. The U-shaped fastener 82 has two legs 76 that are oriented so that each leg extends away from the restraining cable 68. Spring loaded tongue 78 spans the distance between the two legs 76 of the U-shaped fastener 82. A spring is used to keep the tongue 78 in a locked position across the space between the legs 76 until the tongue 78 is manually retracted from between the legs 76.

The U-shaped fastener 82 may be connected to a set of two square plates 80 that are located on the hitch assembly 14. There is one set of plates 80 at the right cross beam end 32 and another set at the left cross beam end 34. One plate of each set is fixed to a top edge of the connection plate 36 that is welded to that end of the cross beam 30. The other plate of the two plate set 80 is welded to a top face of the cross beam 30. The plates 80 of a set are located close enough together so that both fit into the space between the two legs 76 of the U-shaped fastener 82. Additionally, the lines of intersection formed by each plate and the hitch assembly are perpendicular to a center line of the cross beam 30.

Each of the square plates has a tongue hole 84 through which the spring loaded tongue 78 may extend. The restraining cable 68 is connected to the hitch assembly 14 by retracting the tongue 78 from between the legs 76 of the fastener 82; placing the fastener 82 over the set of square plates 80 and then releasing the spring loaded tongue 78 so that it again spans the distance between the legs 76 of the U-shaped fastener 82 while also extending through the tongue holes 84 of the square plate 80 thereby locking the fastener 82 about the set of square plates 80. When connection of the U-shaped fastener 82 to the hitch assembly 14 has been accomplished, backward rotation away from the tractor 12 of the boom 40 about the pintle 86 is restricted thereby keeping the cutting assembly 18 positioned to either side of a center line of the extension beam 38. A fastener assembly 74 includes both the U-shaped fastener 82 and the two sets of two square plates 80.

Figure 5:
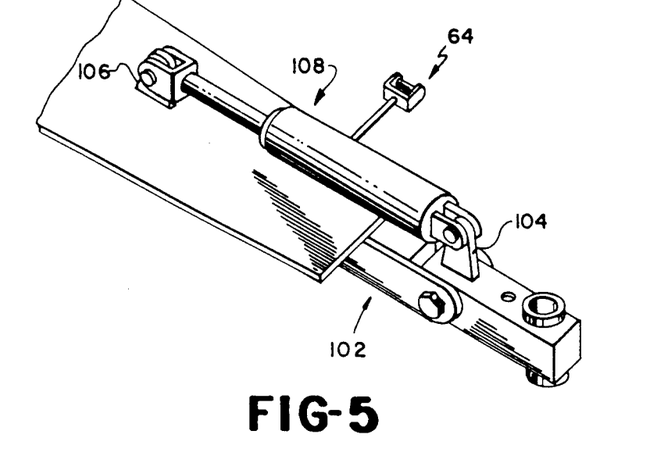
FIG. 5 is a cut away perspective view of boom showing the tilting assembly.

Tilting assembly 64 is located along the length of the boom 40. The tilting assembly 64 includes pivoting connection 102 that is located along the boom 40. The pivoting connection 102 includes a cylinder through which a pin is journalled and about which the power unit end 52 of the boom 40 is rotated. The power unit end 52 of the boom 40 is raised and lowered by tilting unit 108 thereby affecting rotation about a center line of the cylinder of the pivoting connection 102. Cylinder side stay 104 is fixed to the boom top face 90 between the pivoting connection 102 and the cylinder 94. Power unit side stay 106 is fixed to the deflection plate 58 above a center line of the boom 40 and between the pivoting connection 102 and the power unit 28. The tilting unit 108 is journalled between the cylinder side stay 104 and the power unit side stay 106 and includes a rod that reciprocates within a bore and is driven by hydraulic pressure. The rod extends from the bore and retracts back into the bore in response to an applied hydraulic pressure. By retracting the tilting unit 108, the power unit end 52 of the boom 40, and in turn the cutting assembly 18 is tilted upward so that the boom 40 is at an angle above horizontal. When the tilting unit extends, the power unit end 52 of the boom 40 is lowered so that the boom 40 is at an angle below horizontal. When the cutting assembly 18 is raised by the tilting assembly 64, the fence row cleaner 10 has the ability to mow and clear embankments along which the tractor 12 may travel. By lowering the boom 40, the fence row cleaner 10 can mow and clear downward sloping sides of drainage ditches and other declines along which the tractor 12 may travel.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits cf the invention and the bounds of the patent protection are measured by and defined in the following claims.

SUBJECT MATTER CLAIMED FOR PROTECTION

I claim as my invention:

1. An agricultural fence row cleaner hitched to an agricultural tractor and comprising in combination therewith:
   a. a hitch assembly connected to the tractor;
   b. a cleaner frame mixed to the hitch assembly; and
   c. a cutting assembly attached to the frame and having;
      1. a flail shaft journalled to the cleaner frame;
      2. said flail shaft having an upper shaft end and a distal shaft end;
      3. at least two cutting flails attached at the distal shaft end of the claim shaft;
      4. each of said cutting flails being: i. flexible ii. about two feet in length, and iii. about five pounds in weight; and
      5. a power unit rotatingly connected to the flail shaft;
   d. said flails being a fabric reinforced rubber bat;
   e. each of said flails being about three quarters of an inch thick and about three inches wide;
   f. the power unit rotates the flail shaft at varying speeds up to 600 revolutions per minute;
   g. the power unit is a hydraulic motor;
   h. the cutting assembly is located at a power unit end of a boom and the cutting assembly further comprises;
      1. a disk fixed to the distal shaft end;
      2. each cutting flail being attached to the disk;
      3. the flail shaft being journalled to the boom within bearings located at a boom bottom face;
   j. an extension beam fixed to the hitch assembly;
   k. said extension beam being oriented so that it extends away from the tractor at the hitch assembly;
   l. said extension beam being further oriented so that a center line of the extension beam is parallel to a center line of the tractor; and
   m. the boom pivotally connected to the extension beam about an upright pintle axis that is perpendicular to and intersects a center line of the extension beam.

2. An agricultural fence row cleaner hitched to an agricultural tractor and comprising in combination therewith:
   a. a hitch assembly connected to the tractor;
   b. a cleaner frame fixed to the hitch assembly; and
   c. a cutting assembly attached to the frame and having:
      1. a flail shaft journalled to the cleaner frame;
      2. said flail shaft having an upper shaft end and a distal shaft end;
      3. at least two cutting flails attached at the distal end of the flail shaft;
      4. each of said cutting flails being i. flexible, ii. about two feet in length, and iii. about five pounds in weight; and
      5. a power unit rotatingly connected to the flail shaft;
   the cleaner frame further comprising:
      1. an extension beam fixed to the hitch assembly;
      2. said extension beam being oriented so that it extends away from the tractor at the hitch assembly;
      3. said extension beam being further oriented so that a center line of the extension beam is parallel to a center line of the tractor;
      4. a boom pivotally connected to the extension beam about an upright pintle axis that is perpendicular to and intersects a center line of the extension beam.

3. The invention as defined in claim 2 further comprising:
   e. a pivoting assembly that allows the boom to pivot about a back end of the extension beam;
   f. a restraining assembly that positions and holds the cutting assembly to either side of the extension beam;
   g. a tilting assembly that raises and lower a power unit end of the boom; and
   h. a rotating assembly that rotates a portion of the cleaner frame about a center line of the extension beam.

4. The invention as defined in claim 3 wherein the tilting assembly further comprises:
   j. a pivoting connection located along the length of the boom and about which a power unit end of the boom revolves when the power unit end is raised and lowered;
   k. a cylinder side stay fixed to a broom top face between an extension beam end of the boom and the pivoting connection;
   l. a power unit side tray fixed to a deflection plate at a location directly above a center line of the boom and between the pivoting connection and the power unit end of the boom;
   m. a tilting unit journalled between the cylinder side stray and the power unit side stay; and
   n. said tilting unit having the ability to extend and retract.

5. The invention as defined in claim 3 wherein said pivoting assembly further comprises:

j. a pintle fixed to an extension beam top face at the back end of the extension beam;
k. said pintle being cylindrical in shape;
l. the pintle having a cylindrical top collar fixed to a top end of the pintle;
m. said top collar having an outer diameter greater than an outer diameter of the pintle;
n. the top collar and the pintle have a common center line;
o. a hollow cylinder positioned so that the cylinder passes through a boom top face and a boom bottom face thereby creating an open ended round tube through an extension beam end of the boom;
p. said cylinder being oriented so that the cylinder's center line is perpendicular to and intersects a center line of the boom;
q. the cylinder having an inner diameter greater than an outer diameter of the top collar; and
r. the cylinder being placed over the top collar and pintle thereby pivotally connecting the boom to the extension beam.

6. The invention as defined in claim 5 further comprising:
s. a boom pin hole through the boom top face and the boom bottom face;
t. an extension beam pin hole through the extension beam top face; and
u. said boom pin hole and said extension beam pin hole are positioned so that when the boom is extended directly behind and parallel to the extension beam, the boom pin hole and the extension beam pin hole have a common center line thereby allowing the boom to be locked into a position straight behind the extension beam when a locking pin is placed through the holes.

7. The invention as defined in claim 3 wherein the restraining assembly further comprises:
j. a restraining cable connectable between the boom and the hitch assembly;
k. said restraining cable being spring tensioned;
l. said restraining cable having a boom end attached to the boom on a boom bottom face; and
m. said restraining cable having a fastener end attached to a fastener assembly.

8. The invention as defined in claim 7 wherein the fastener assembly further comprises:
n. a U-shaped fastener being attached to the fastener end of the restraining cable;
o. said U-shaped fastener having two legs which extend away from the restraining cable;
p. a spring loaded tongue that spans a space between the legs;
q. the tongue rests in a locked positioned across the space between the legs;
r. said tongue being manually slidable out of the space between the legs;
s. two sets of two square plates;
t. one set of two square plates being located at one end of the hitch assembly while the other set is located on an opposite end of the hitch assembly;
u. said hitch assembly includes:
1. a cross beam to which the cleaner frame is fixed;
2. said cross beam having a right cross beam end and a left cross beam end; and
3. two connection plates, one each fixed to the right cross beam end and the left cross beam end.
v. the two square plates of each set are oriented so that each plate is opposite and parallel to the other;
w. each square plate being oriented so that all lines formed by the intersection of the square plates and the hitch assembly are perpendicular to a center line of the cross beam;
x. one of the square plates of the two plate set being fixed to a top edge of one of the connection plates while the other of the two square plates is fixed to a top face of the cross beam;
y. the two plates of each set of two square plates sets are positioned close enough together so that together the plates fit between the legs of the U-shaped fastener; and
z. each plate having a tongue hole through which the tongue of the U-shaped fastener may extend.

9. The invention as defined in claim 7 further comprising:
n. a right block fixed to a right face of the extension beam;
o. a left block fixed to a left face of the extension beam;
p. the right block and the left block are oriented so that each block is opposite the other with the extension beam between the right block and the left block; and
q. the right block and the left block are located along the extension beam so that a most rearward vertical side that is away from the tractor of either the right block or the left block abuts a most forward vertical side of the boom that is nearest the tractor when the boom is at a right angle to the extension beam.

10. The invention as defined in claim 3 further comprising:
j. a pivoting connection located along a length of the boom and about which a power unit end of the boom revolves when the power unit end is raised and lowered;
k. a cylinder side stay fixed to a boom top face between an extension beam end of the boom and the pivoting connection;
l. a power unit side stay fixed to a deflection plate at a location directly above a center line of the boom and between the pivoting connection and the power unit end of the boom;
m. a tilting unit journalled between the cylinder side stay and the power unit side stay;
n. said tilting unit having the ability to extend and retract;
o. a pintle fixed to an extension beam top face at the back end of the extension beam;
p. said pintle being cylindrical in shape;
q. the pintle having a cylindrical top collar fixed to a top end of the pintle;
r. said top collar having an outer diameter greater than an outer diameter of the pintle;
s. the top collar and the pintle have a common center line;
t. a hollow cylinder positioned so that the cylinder passes through a boom top face and a boom bottom face thereby creating an open ended round tube through an extension beam end of the boom;
u. said cylinder being oriented so that the cylinder's center line is perpendicular to and intersects a center line of the boom;
v. the cylinder having an inner diameter greater than an outer diameter of the top collar;
w. the cylinder being placed over the top collar and pintle thereby pivotally connecting the boom to the extension beam;

x. a boom pin hole through the boom top face and the boom bottom face;

y. an extension beam pin hole through the extension beam top face;

z. said boom pin hole and said extension beam pin hole are positioned so that when the boom is extended directly behind and parallel to the extension beam, the boom pin hole and the extension beam pin hole have a common center line thereby allowing the boom to be locked into a positioned straight behind the extension beam when a locking pin is placed through the holes;

aa. a restraining cable connectable between the boom and the hitch assembly;

bb. said restraining cable being spring tensioned;

cc. said restraining cable having a boom end attached to the boom on a boom bottom face;

dd. said restraining cable having a fastener end attached to a fastener assembly;

ee. a U-shaped fastener being attached to the fastener end of the restraining cable;

ff. said U-shaped fastener having two legs which extend away from the restraining cable;

gg. a spring loaded tongue that spans a space between the legs;

hh. the tongue rests in a locked position across the space between the legs;

jj. said tongue being manually slidable out of the space between the legs;

kk. two sets of two square plates;

ll. one set of two square plates being located at one end of the hitch assembly while the other set is located at an opposite end of the hitch assembly;

mm. said hitch assembly includes:
 1. a cross beam to which the cleaner frame is fixed;
 2. said cross beam having a right cross beam end and a left cross beam end; and
 3. two connection plates, one each fixed to the right cross beam end and the left cross beam end;

nn. the two square plates of each set are oriented so that each plate is opposite and parallel to the other;

oo. each square plate being oriented so that all lines formed by the intersection of the square plates and the hitch assembly are perpendicular to a center line of the cross beam;

pp. one of the square plates of the two plate set being fixed to a top edge of one of the connection plates while the other of the two square plates is fixed to a top face of the cross beam;

qq. the two plates of each set of set square plates sets are positioned close enough together so that together the plates fit between the legs of the U-shaped fastener;

rr. each plate having a tongue hole through which the tongue of the U-shaped fastener may extend;

ss. a right block fixed to a right face of the extension beam;

tt. a left block fixed to a left face of the extension beam;

uu. the right block and the left block are oriented so that each block is opposite the other with the extension beam between the right block and the left block; and vv. the right block and the left block are located along the extension beam so that a most rearward vertical side that is away from the tractor of either the right block or the left block abuts a most forward vertical side of the boom that is nearest the tractor when the boom is at a right angle to the extension beam.

11. An agricultural fence now cleaner hitched to an agricultural tractor and comprising in combination therewith:

a. a hitch assembly connected to the tractor;

b. a cleaner frame fixed to the hitch assembly; and c. a cutting assembly attached to the frame and having:
 1. a flail shaft journalled to the cleaner frame;
 2. said flail shaft having an upper shaft end and a distal shaft end;
 3. at least two cutting flails attached at the distal shaft end of the flail shaft;

d. each of the cutting flails being flexible;

e. each of the cutting flails having:
 i. a length measured distally away from the flail shaft,
 ii. a width measured perpendicularly to the length of the flail, and
 iii. a thickness;

f. the length being at least 10 times the width;

g. the width being at least 3 times the thickness;

h. the length being at least 20 times the thickness;

j. a disk fixed to the distal shaft end;

k. the disk having a width measured perpendicularly to the flail shaft;

l. the width of the disk being about 3 times the width of each flail, m. the length of each flail being about 2 times the width of the disk, n. each cutting flail attached to the disk so that each of said flails extends radially away from the flail shaft during operation.

12. The invention as defined in claim 11 further comprising:

o. the length of each flail being about two feet and p. each flail weighting about five pounds.

13. The invention as defined in claim 11 further comprising:

o. said flails being a fabric reinforced rubber bat.

14. The invention as defined in claim 11 further comprising:

o. each of said flails being about three-quarters of an inch thick and about three inches wide.

15. The invention as defined in claim 11 further comprising:

o. a power unit connected to the flail shaft that rotates said flail shaft at varying speeds up to 600 revolutions per minute.

16. The invention as defined in claim 15 wherein the power unit is a hydraulic motor.

* * * * *